United States Patent [19]

Clark et al.

[11] Patent Number: 4,881,424

[45] Date of Patent: Nov. 21, 1989

[54] BRAKE ACTUATOR

[75] Inventors: Russell L. Clark, Zeeland; Roger Bomgaars, Mattawan, both of Mich.

[73] Assignee: Prince Corporation, Holland, Mich.

[21] Appl. No.: 195,806

[22] Filed: May 19, 1988

[51] Int. Cl.⁴ .......................... G05G 1/04; G05G 5/06
[52] U.S. Cl. .................... 74/523; 74/501.6; 74/535; 74/537; 297/411
[58] Field of Search .............. 74/512, 560, 535, 537, 74/534, 538, 500.5, 501.6, 471 XY, 523, 515 E, 524, 533, 536; 297/411

[56] References Cited

U.S. PATENT DOCUMENTS

| 1,845,401 | 2/1932 | Dietrich . | |
|---|---|---|---|
| 2,272,174 | 2/1942 | Jandus | 74/537 |
| 2,507,997 | 5/1950 | Roedding et al. | 74/537 X |
| 3,310,995 | 3/1967 | Buchwald | 74/535 |
| 3,743,047 | 7/1973 | Dapolito . | |
| 3,929,033 | 12/1975 | Marx | 74/512 |
| 4,040,499 | 8/1977 | Kestian | 74/471 XY X |
| 4,200,166 | 4/1980 | Hansen . | |
| 4,478,308 | 10/1984 | Klaassen . | |
| 4,601,515 | 7/1986 | Hatsutta et al. . | |
| 4,612,823 | 9/1986 | De Leeuw et al. | 74/535 X |

FOREIGN PATENT DOCUMENTS 1315871 12/1961 France .................................. 74/537

*Primary Examiner*—Rodney M. Lindsey
*Attorney, Agent, or Firm*—Price Heneveld Cooper DeWitt & Litton

[57] ABSTRACT

A vehicular parking brake is incorporated within and operates in conjunction with a centrally mounted armrest. The parking brake is actuated by swinging the armrest upwardly. The locking components are fashioned such that the armrest may be returned to its rest position without effecting the release of the parking brake which is accomplished by pressing an easily reached release lever mounted to the armrest.

17 Claims, 4 Drawing Sheets

BRAKE ACTUATOR

BACKGROUND OF THE INVENTION

The present invention pertains to vehicular parking brakes, and in particular to an assembly for actuating and releasing the parking brake.

The actuation and release of the parking brake has been subject to a myriad of different structural configurations. One salient quality of such assemblies concerns easy accessibility for the driver. Another important aspect for parking brake assemblies is to avoid interference with normal driving, since it is essentially only used upon parking of the vehicle or in emergencies. Also, it is desirable to fashion such assemblies so that they do not detract from the aesthetic appeal of the vehicle interior.

One typical arrangement is to provide a foot pedal for locking the brake and a separate hand lever for the release thereof located, for instance, in the dash or gearshift lever. However, the inclusion of a foot pedal restricts the available foot space for the driver of a vehicle and increases the risk of interference in the normal operation of the vehicle.

Another common assembly involves the use of a central lever pivotally mounted between the vehicle's front seats. The lever acts to lock the brake when pulled upward and effect release thereof when lowered. Yet, the lever's locking cooperative relationship with a ratchet mechanism orients the lever in an upraised position when the parking brake is actuated. Such a construction not only detracts from the visual appeal of the vehicle's interior, but also creates a substantial interference for the vehicle's occupants. Moreover, the central placement of such a lever eliminates the option of providing a central vehicular armrest.

SUMMARY OF THE INVENTION

In accordance with the present invention, a unique parking brake actuator is provided which incorporates the desired features of easy accessibility, avoidance of interference with the occupants' actions and enhancement of the aesthetic appeal of the vehicular interior in one novel construction.

The actuator includes an armrest which is movably mounted to a frame and adapted to cooperate with a locking mechanism to actuate the parking brake upon a predetermined movement of the armrest. The cooperative interconnection of the armrest and locking mechanism is arranged such that the armrest may be returned to its normal rest position after the actuation of the parking brake without causing the release thereof. The release of the parking brake is then achieved through a release lever positioned within a cavity in the armrest.

By using the actuator of the present invention, the actuation and release of the parking brake is effected by an easily operated assembly in a convenient location for the driver. Moreover, the actuator, by being integrally situated within and in unique cooperation with the armrest, engenders no additional restrictions or interferences with the vehicle's occupants. Further, the visual appeal of the vehicle's interior suffers no diminishment as is common in prior devices.

These and other objects, advantages and features of the present invention will be more fully understood and appreciated by reference to the written specification and appended drawings.

DETAILED DESCRIPTION OF THE PREFERRED EMBODIMENT

Figure 1:
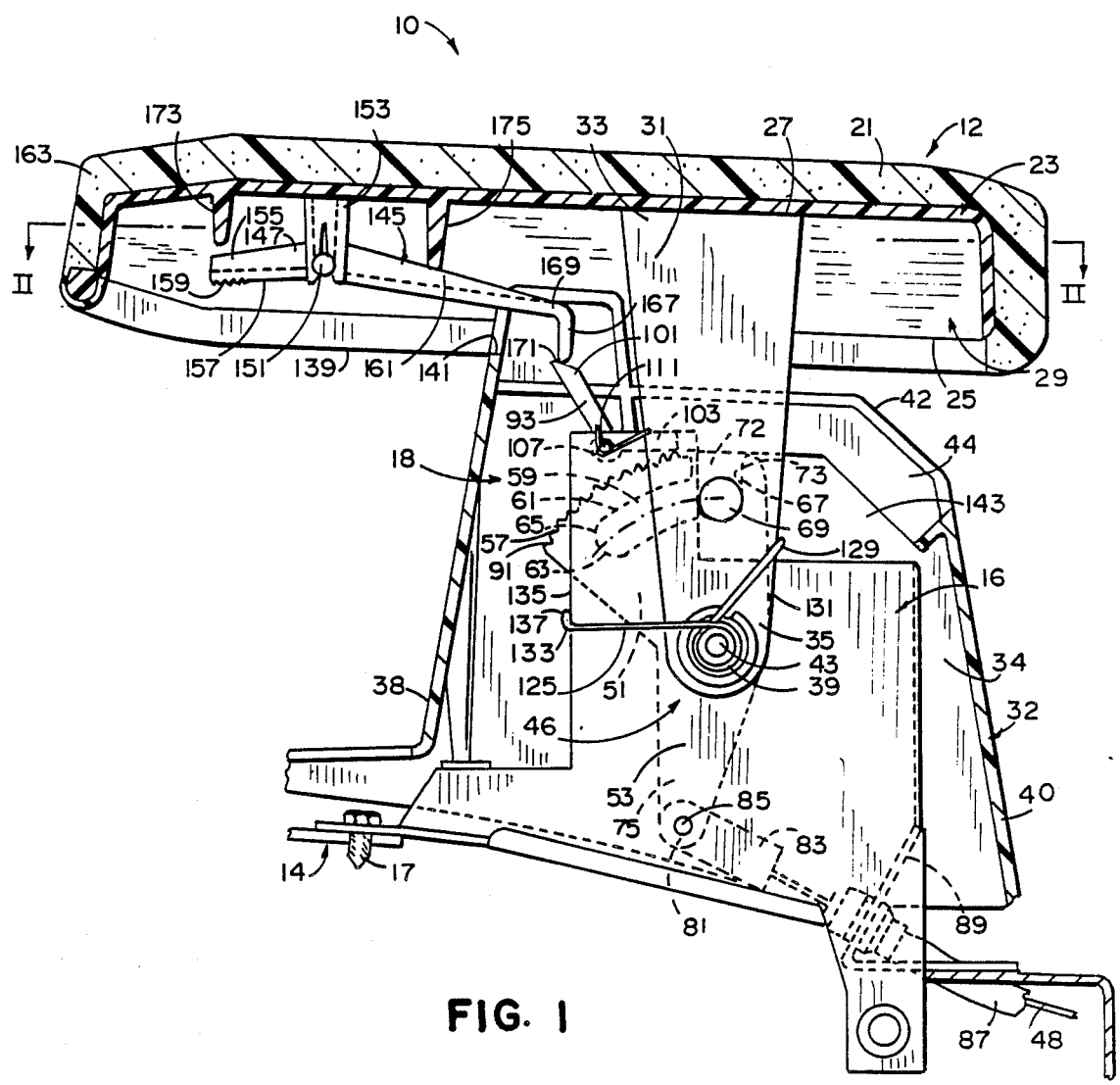
FIG. 1 is a vertical cross-sectional view of the assembly of the present invention taken along section line I—I in FIG. 2.

In the preferred embodiment, a vehicular parking brake is actuated and released through the use of an actuator 10 employing an armrest 12 centrally positioned between the front passenger seats (not shown). The use of armrest 12 facilitates easy accessibility for the driver, without detracting from the aesthetic appearance of the interior of the vehicle or the available open space therein.

Armrest 12 is pivotally mounted to a frame 16 secured to the vehicle 14 by conventional fasteners 17 (FIGS. 1 and 3) for movement between a generally horizontal rest position (FIG. 1) and a raised inclined position (FIG. 3) for actuation of the parking brake (not shown) through brake cable 48. The actuation is accomplished by a locking mechanism 18 which is designed to actuate the parking brake as armrest 12 is pivoted upwardly in a direction indicated by arrow A in FIG. 3. Further, locking mechanism 18 interconnects with armrest 12 in a lost motion capacity, so that armrest 12 may be returned to its rest position without effecting the release of the parking brake.

Armrest 12 includes a cushion 21 adapted to provide a comfortable resting surface for an occupant's arm. Cushion 21 possesses a substantially inverted trough-shaped configuration and is wrapped about and affixed to a supporting hard shell 23. Shell 23 is also of a similar hollow construction having a pair of opposed sides 25 interconnected by an upper base surface 27. Sides 25 and base surface 27 collectively define a cavity 29.

A pair of opposed space support legs 31 extend within cavity 29 such that the upper ends 33 thereof extend contiguously along sides 25 and are attached thereto by bolts, rivets or other fastening means (not shown). The lower ends 35 of legs 31 project downwardly and are positioned about sidewalls 37 of frame 16 for pivotal connection therewith. Ends 35 include bores 39 which are aligned with holes 41 in frame sidewalls 37 for receiving a pivot pin 43 for enabling armrest 12 to be pivotally swung between the horizontal rest position (FIG. 1) and the upraised position (FIG. 3) actuating the parking brake. The extent of armrest movement is approximately 45 degrees, although a wide range of movements could be used.

Frame 16, locking mechanism 18 and lower ends 35 of legs 31 are enclosed within housing 32. Housing 32 is preferably a generally rectangular hollow structure having a pair of sidewalls 34, 36, a front wall 38, a rear wall 40 and a top wall 42. Top wall 42 includes a pair of elongate slots 44 which are adapted to receive therethrough legs 31 for the moving support of armrest 12. Housing 32, by substantially enclosing the above operative components, not only alleviates their fouling by limiting the collection of dirt and debris therein, but also enhances the aesthetic appearance of the vehicle's interior.

The locking mechanism 18 transfers the movements of armrest 12 in a manner that produces the desired parking brake actuation. The main component of locking mechanism 18 comprises a locking plate 46 which is movably mounted on frame 16 and is coupled to armrest 12 and the parking brake cable 48. Locking plate 46 is preferably a generally planar member having an upper body 51, a lower tail 53 and a centrally located mounting bore 55 adapted to receive pivot pin 43. The arrangement of mounting armrest 12 and locking plate 46 on the same pivot pin 43 functions to synchronize the rotative movements of the two components, as will be discussed below.

Upper body 51 of locking plate 46 further includes an upper arcuate edge 57 and a generally parallel, elongate arcuate slot 59 spaced radially inwardly thereof. More specifically, slot 59 is defined by upper and lower arcuate sides 61, 63 and forward and rearward ends 65, 67; and is oriented so that slot 59 is radially spaced from pivot pin 43 a uniform distance across its length. Slot 59 then cooperates with armrest 12 to enable synchronized movement of the components during parking brake actuation and the above mentioned lost motion capability.

An abutment rod 69, fixedly attached to legs 31 to extend across the space 71 and through slot 59, is provided to facilitate the coupling of armrest 12 with locking plate 46. Preferably, upper and lower sides 61, 63 of slot 59 are spaced apart to matingly receive abutment rod 69 therein, although such a mating arrangement is not critical to the operation of actuator 10. Also, to facilitate manufacture of actuator 10, an open passageway 72 is provided at the rearward end 67 of arcuate slot 59 to permit passage therethrough of abutment rod 69 into slot 59.

Rearward end 67 of slot 59 defines an abutment face 73 which is adapted to be positioned in engagement with abutment rod 69 when in its rest position (FIG. 1). As armrest 12 is rotated about pivot pin 43 to its upraised position (FIG. 3), abutment rod 69 engages abutment face 73 and also drives locking plate 46 synchronously about pivot pin 43, to effect actuation of the parking brake. More specifically, the actuation of the parking brake is effected by the coupling of lower tail 53 with parking brake cable 48. Lower tail 53 extends downwardly from pivot pin 43 and is attached at its distal end 75 to parking brake cable 48. Preferably, such attachment is made by providing an opening 81 in tail 53 and pivotally attaching thereto a split coupler 83 with a coupling pin 85. Coupler 83 is fixedly secured to an end of parking brake cable 48 which passes through sheath 87 and onward to the parking brake in a conventional manner. Sheath 87 is secured against movement, in part, through its fixed securement to frame 16 on inclined wall 89.

Figure 3:
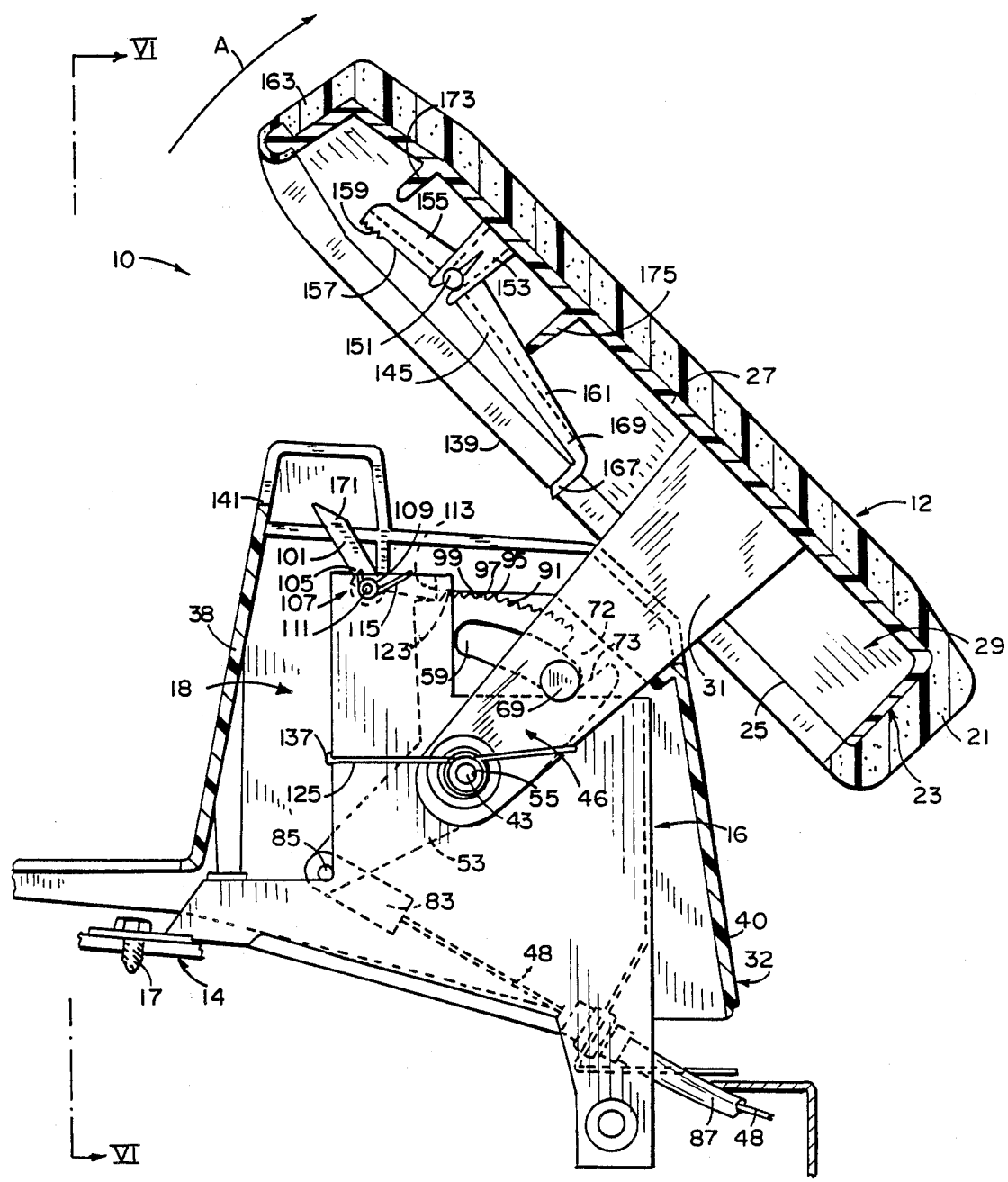
FIG. 3 is a vertical cross-sectional view of the assembly of the present invention with the armrest moved to actuate the parking brake.

In use, then, the locking of the parking brake (not shown) is effected by swinging armrest 12 upwardly from its rest position in FIG. 1 to an upraised position as shown in FIG. 3. Although a complete arcuate swinging movement is illustrated in FIG. 3, a lesser amount of swinging could be performed which, in turn, would actuate the parking brake a corresponding lesser amount. As discussed above, this movement of armrest 12 engenders a synchronous rotative movement of locking plate 46 through the engagement of abutment rod 69 with abutment face 73. This swinging of locking plate 46, in turn, rotates tail 53 clockwise about pivot pin 43 (as seen in FIGS. 1 and 3) to thereby pull cable 48 outward of sheath 87 to actuate the parking brake.

The parking brake is then locked in its actuated position through the use of a series of serrations or ratchet teeth 91 which cooperatively interact with a pivotally mounted pawl 93. More specifically, along the forward segment 95 of upper edge 57 is provided a plurality of aligned serrations 91 each including a ramp surface 97 and a forward facing abutment surface 99, as is conventional in ratchet mechanisms. Pawl 93, pivotally secured to frame 16, operates in conjunction with serrations 91 to lock locking plate 46 in an actuated position. Pawl 93 includes a pair of arms 101, 103 which are interconnected into a broad V-shaped configuration. At the apex 105 thereof, a boss 107 having an aperture 109 passing therethrough is provided to receive pin 111 to accomplish the pivotal coupling of pawl 93 to frame 16.

One arm 103 of pawl 93 acts as a locking arm having a locking face 113 adapted to cooperate with serrations 91 and lockingly engage any of the abutment surfaces 99 to preclude counterclockwise movement of locking plate 46 (as shown in FIGS. 1 and 3). A pair of torsion springs 115 to maintain locking arm 103 in engagement with serrations 91 and permit limited rocking movement thereof to accommodate the passing over of ramp surfaces 97 in a conventional ratchet manner. Preferably, a pair of torsion springs are mounted along each side of pawl 93 such that one end 117 is received over a top surface 119 of locking arm 103, and the other end 121 is received through a small opening for securement to frame 16. Of course, a variety of springs and mounting arrangements could be utilized to provide the necessary biasing force. The other arm 101 is a leverage arm which acts to release pawl 93 from locking engagement with serrations 91, as will be discussed below.

Figure 4:
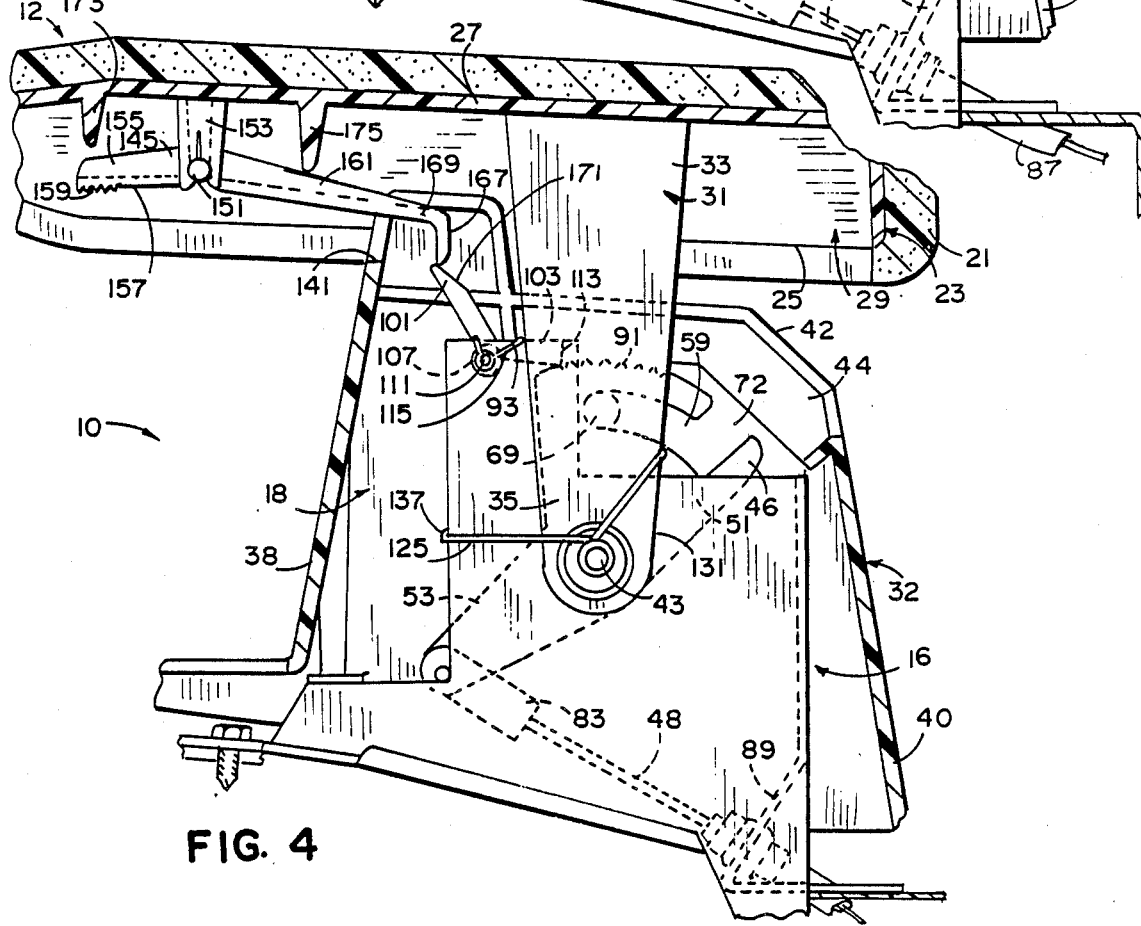
FIG. 4 is a vertical cross-sectional view of the assembly shown in the normal locked position of the parking brake.
Figure 6:
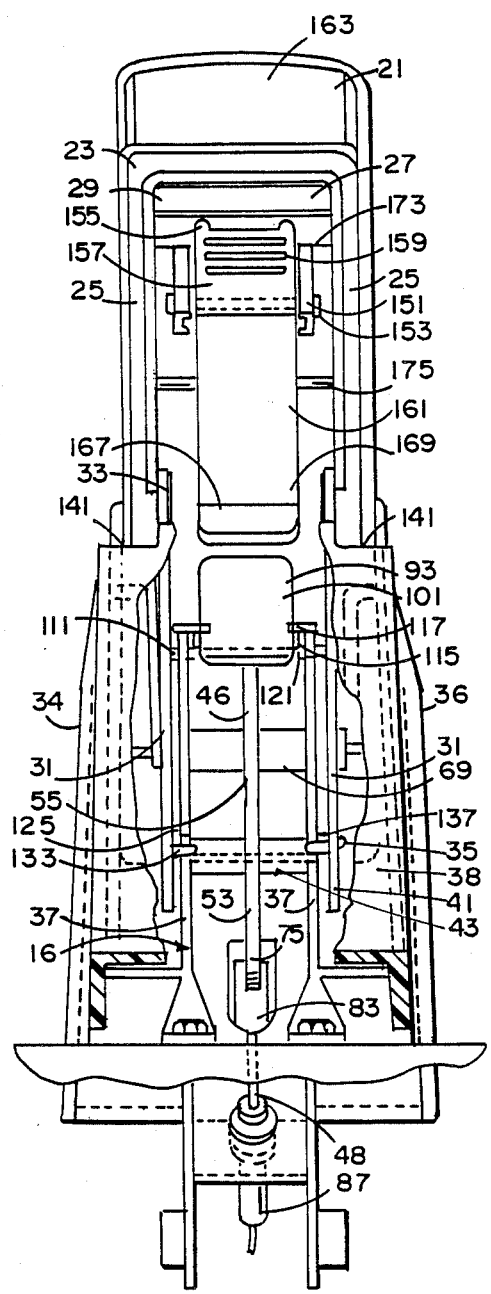
FIG. 6 is a front view of the assembly as oriented in FIG. 3 with the housing broken away.

In order to permit the continued usefulness of armrest 12 and avoid creating an annoying obstruction to the occupants once the parking brake is actuated, armrest 12 may be returned to its rest position (as seen in FIG. 4) without effecting the release of the parking brake. This lost motion capability is accomplished through the provision of arcuate slot 59. As armrest 12 is rotated in a counterclockwise direction (as seen in FIGS. 3 and 4) toward its rest position, abutment rod 69 passes through arcuate slot 59 toward its forward end 65, and thereby imposes no movement on locking plate 46. Hence, once armrest 12 reaches its rest position (FIG. 4) abutment rod 69 is positioned against forward end 113, if locking plate 46 had been rotated to its completely locked position (that is, pawl 91 engaging the forwardmost serration 123) as is illustrated in FIG. 4. If the parking brake had been only partially actuated, abutment rod 69 would be positioned medially along slot 59 when armrest 12 is returned to its rest position.

Preferably, a torsion spring 125 is provided to ensure that armrest 12 returns to its rest position (FIG. 4) after being pivoted upwardly to lock the parking brake. A pair of torsion springs 125 are mounted upon pivot pin 43 and positioned between the narrow gaps 127 defined between legs 31 and sidewalls 37. One end 129 of torsion spring 125 wraps about the rearward edge 131 of an adjacent leg 31 and the other end 133 wraps about forward edge 135 of frame 16. A knob 137, secured to forward edge 135, is positioned above end 133 to maintain spring 125 in its proper position. This arrangement creates a biasing force and moves armrest 12 toward its rest position (illustrated in FIGS. 1 and 4). Armrest 12 is precluded from rotating past its horizontal position through the engagement of its lower edges 139 engaging stop shoulders 141 provided along the upper portion of housing 32. Of course, a myriad of different structural configurations could be utilized to act as a stop for armrest 12.

Figure 2:
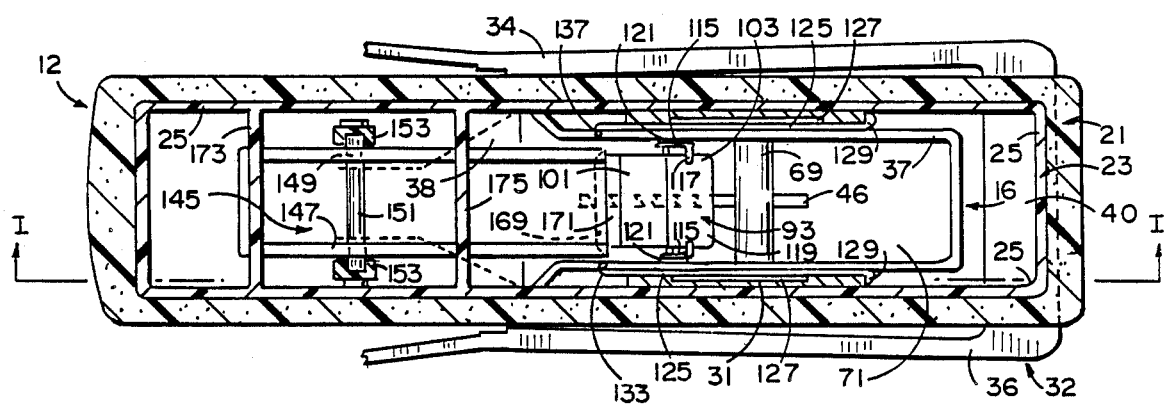
FIG. 2 is a horizontal cross-sectional view of the assembly of the present invention taken along section line II—II in FIG. 1.

The above described movements and mountings of the actuator components are facilitated by constructing frame 16 to have a generally U-shaped configuration (FIG. 2). Sidewalls 37 are structured to mount pivot pins 43 and 111 for the mounting of armrest 12, locking plate 46 and pawl 93. Moreover, sidewalls 37 provide the resisting force for the biasing of torsion springs 115 and 125. Further, frame 16 is provided with a rear cutaway portion 143 (FIGS. 1 and 3-5) which accommodates the arcuate movement of abutment rod 69 as it swings with legs 31.

A release lever 145 is pivotally mounted to shell 23 within cavity 29 in order to cooperate with pawl 93 in effecting the release of the parking brake. More specifically, release lever 145 is preferably of a generally U-shaped configuration having upraised sides 147; but of course could be constructed in any desired shape. Intermediately along the length of release lever 145 is provided a pair of aligned holes 149 passing through sides 147 to receive therethrough a pivot pin 151. A pair of mounting flanges 153 project downwardly from base surface 27 of shell 21 along each side 147 of release lever 145 to support opposite ends of pivot pin 151, and thereby pivotally mount release lever 145. Release lever 145 is preferably oriented within cavity 29 to be hidden from the occupant's view.

The forward segment 153 of release lever 145 is positioned near the forward end 155 of armrest 12 to be within easy reach of the operator's fingers when curled about the forward end 155. Lower face 157 of forward end 155 is provided with ridges 159 or a roughened surface (not shown) to enhance the manual engagement of the operator. Rearward segment 161 extends rearwardly beyond front wall 38 of housing 32 to overlie pawl 93 when armrest 12 is in its rest position. More specifically, a foot 167 extends downwardly from the free rearward end 169 of release lever 145 to engage the upper distal end 171 of lever arm 101 of pawl 93. Further, rearward segment 161 extends substantially further from pivot pin 151 so that foot 167 is naturally biased by gravity into engagement with lever arm 101.

Figure 5:
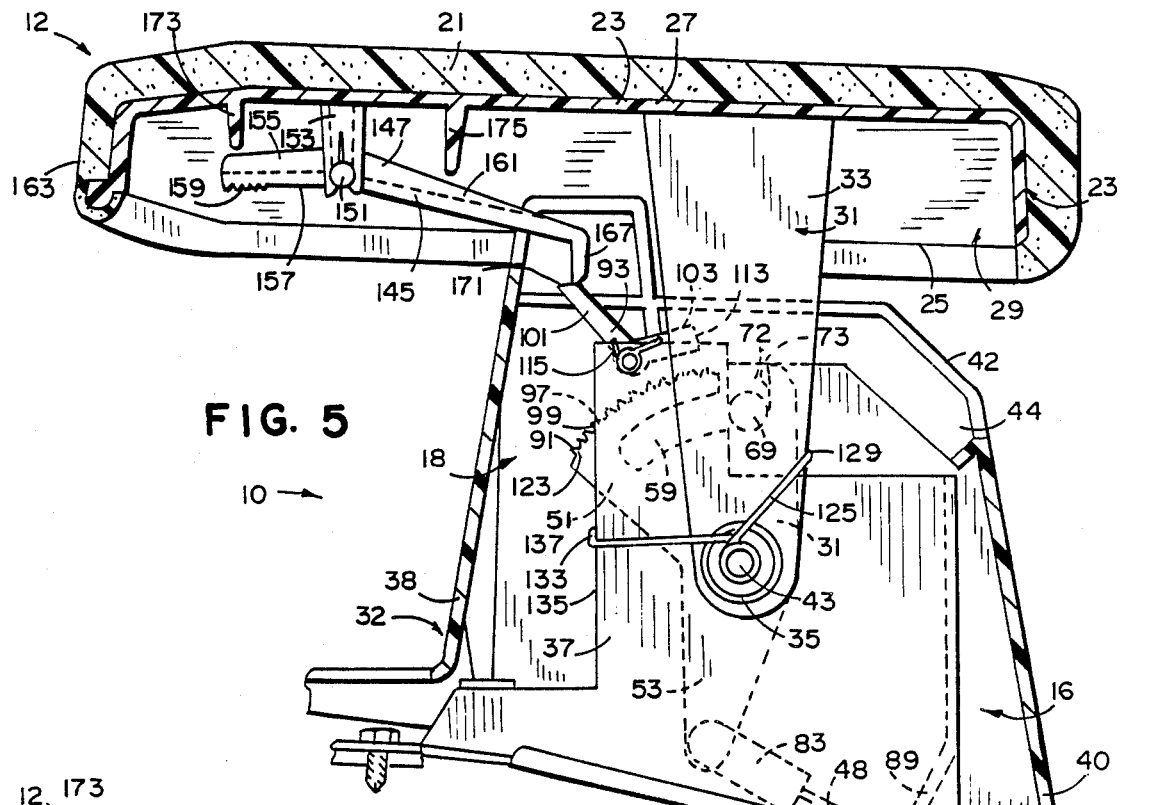
FIG. 5 is a vertical cross-sectional view of the assembly shown in the brake released position.

Furthermore, a pair of stop flanges 173, 175 extend downwardly from base surface 27 of shell 23. Preferably, stop flanges 173, 175 are molded in a unitary manner with shell 23 to extend across cavity 29 to thereby function not only as stops for release lever 145, but also to add additional rigidity to shell 23. Forward stop 173 overlies and abuts forward segment 155 of release lever 145 when pushed upwardly by an operator (FIG. 5). Rearward stop 175 overlies rearward segment 161 to confine the upward movement thereof, so that forward segment 155 will be consistently within easy reach of an operator.

Therefore, to release the parking brake from its locked position (when armrest 12 is in its rest position), an operator presses forward segment 155 of release lever 145 upwardly against forward stop 173. This action causes release lever 145 to rock about pivot pin 151 so that foot 167 presses downwardly on the distal end 171 of lever arm 101 of pawl 93. This downward pressing on lever arm 101 moves pawl 93 in a counterclockwise movement (as seen in FIGS. 4 and 5), against the bias of torsion spring 115, to thereby release locking face 113 from its engaged abutment surface 99 of locking plate 46. Once pawl 93 is disengaged from serrations 91, the resisting force in the brakes retracts cable 48 and, in turn, pulls tail 53 to rotate locking plate 46 in a counterclockwise rotation (as seen in FIGS. 4 and 5) about pivot pin 43 until its abutment face 73 engages abutment rod 69 (FIG. 5).

Of course, it is understood that the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows.

1. A armrest including a parking brake actuator for use in actuating and releasing a vehicular parking brake through a brake control element comprising:
   a frame;
   an armrest movably mounted on said frame between a first position and a second position;
   said brake control element extending to an assembly between said frame and said armrest; and
   said assembly coupled to said brake control element so that the parking brake is actuated as said armrest is moved from said first position toward said second position.

2. The parking brake actuator of claim 1 in which said assembly includes means for enabling said armrest to return to said first position after actuating the parking brake without releasing the parking brake.

3. The parking brake actuator of claim 2 in which said assembly further includes means for releasing the parking brake when said armrest is oriented in said first position.

4. The parking brake actuator of claim 3 in which said assembly further includes a locking member movably mounted on said frame and provided with means for cooperating with the parking brake for actuation and release thereof and with means for cooperating with said armrest such that said locking member moves when said armrest moves toward said second position to thereby actuate the parking brake but does not move when said armrest is moved toward said first position, and wherein said assembly further includes a series of serrations and a pawl, one of said series of serrations and said pawl is provided on said locking member, and the other of said serrations and said pawl is mounted to said frame, said serrations and said pawl being oriented so as to cooperate with one another to thereby lock the parking brake in an actuated position when said armrest is moved away from said first position.

5. The parking brake actuator of claim 4 in which said means for enabling said armrest to return to said first position without releasing the parking brake includes an opening having at least one end wall provided in said locking member and an element fixedly attached to said armrest for movement therewith and received into said opening in said locking member, wherein said element is adapted to engage said end wall and move said locking member when said armrest is moved toward said second position, and said element is adapted to move through said opening when said armrest is moved toward said first position so that said locking member is unaffected by such armrest movement.

6. The parking brake actuator of claim 5 in which said means for releasing the parking brake includes a release lever movably mounted to said armrest and provided with a portion which cooperatively engages said one of said pawl and serrations mounted to said frame to thereby release the engagement between said pawl and serrations so that the parking brake is permitted to move to a release position.

7. The parking brake actuator of claim 6 further including a housing substantially enclosing said frame, said locking member and said pawl, and wherein said armrest further includes a cavity which opens generally downward and receives said release lever therein for mounting, whereby said assembly is substantially hidden from view of the user.

8. The parking brake actuator of claim 4 in which said means for releasing the parking brake includes a release lever movably mounted to said armrest and provided with a portion which cooperatively engages said one of said pawl and serrations mounted to said frame to thereby release the engagement between said pawl and serrations so that the parking brake is permitted to move to a release position.

9. The parking brake actuator of claim 1 in which said assembly further includes a locking member movably mounted on said frame and provided with means for cooperating with the parking brake for actuation and release thereof and with means for cooperating with said armrest such that said locking member moves when said armrest moves toward said second position to thereby actuate the parking brake but does not move when said armrest is moved toward said first position, and wherein said assembly further includes a series of serrations and a pawl, one of said series of serrations and said pawl is provided on said locking member, and the other of said serrations and said pawl is mounted to said frame, said serrations and said pawl being oriented so as to cooperate with one another to thereby lock the parking brake in an actuated position when said armrest is moved away from said first position.

10. A parking brake actuator for use in actuating and releasing a vehicular parking brake comprising:
a frame;
an armrest pivotally mounted to said frame for movement between first and second positions;
a locking mechanism including a locking member pivotally mounted to said frame and having a first coupling means for interconnecting said locking member with the parking brake and a second coupling means for interconnecting said locking member with said armrest, said second coupling means being operable such that said locking member moves with said armrest as said armrest moves toward said second position to thereby actuate the parking brake through said first coupling means, said locking mechanism further including means for locking said locking member in a position in which the parking brake is actuated; and
a release means for cooperating with said locking mechanism to release the parking brake.

11. The parking brake actuator of claim 10 in which said armrest further includes an abutment member and said second coupling means of said locking member includes an abutment wall which is oriented to engage said abutment member when said armrest is moved toward said second position and thereby pivotally move said locking member to actuate the parking brake, and wherein said second coupling means provides a lost motion capability when said armrest is moved toward said first position such that said abutment member disengages from said abutment wall and thereby imposes no movement on said locking member, whereby said armrest can be returned to said first position after actuation of the parking brake without causing release of the parking brake.

12. The parking brake actuator of claim 11 in which said locking member further includes ratchet teeth and said means for locking said locking member includes a pawl which cooperates with said ratchet teeth so as to permit free movement of said locking member when moving to actuate the parking brake and to lock said locking member against movement which releases the parking brake.

13. The parking brake actuator of claim 12 in which said release means includes a lever pivotally mounted to said armrest and provided with a segment adapted to engage and move said pawl out of engagement with said ratchet teeth when operated, whereby said lever effectuates the release of the parking brake.

14. The parking brake actuator of claim 13 further including a housing which substantially encloses said locking member and said pawl, and wherein said armrest further includes a cavity which receives therein said lever of said release means, whereby said locking mechanism and release means are substantially hidden from the view of the user.

15. The parking brake actuator of claim 11 further including a spring means for biasing said armrest toward said first position, whereby said armrest is biased to return to said first position after being moved by the user toward the second position for actuation of the parking brake.

16. The parking brake actuator of claim 11 in which said locking member includes a central pivot axis, an arcuate edge surface having a plurality of ratchet teeth adapted to cooperate with said means for locking said locking member, and a tail segment supporting said first coupling means, and in which said second coupling means includes an arcuate slot in said locking member, adjacent said abutment wall, which receives therethrough said abutment member to facilitate said lost motion capability.

17. The parking brake actuator of claim 10 further including a housing which substantially encloses said locking mechanism, and wherein said armrest further includes a cavity which receives therein said release means, whereby said locking mechanism and release means are substantially hidden from the view of the user.

* * * * *